Patented Oct. 13, 1925.

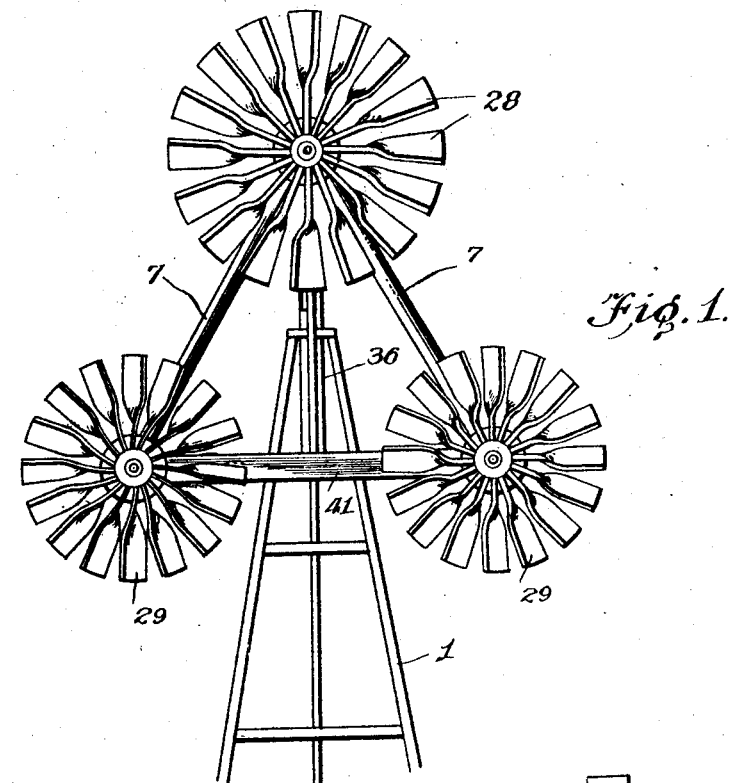
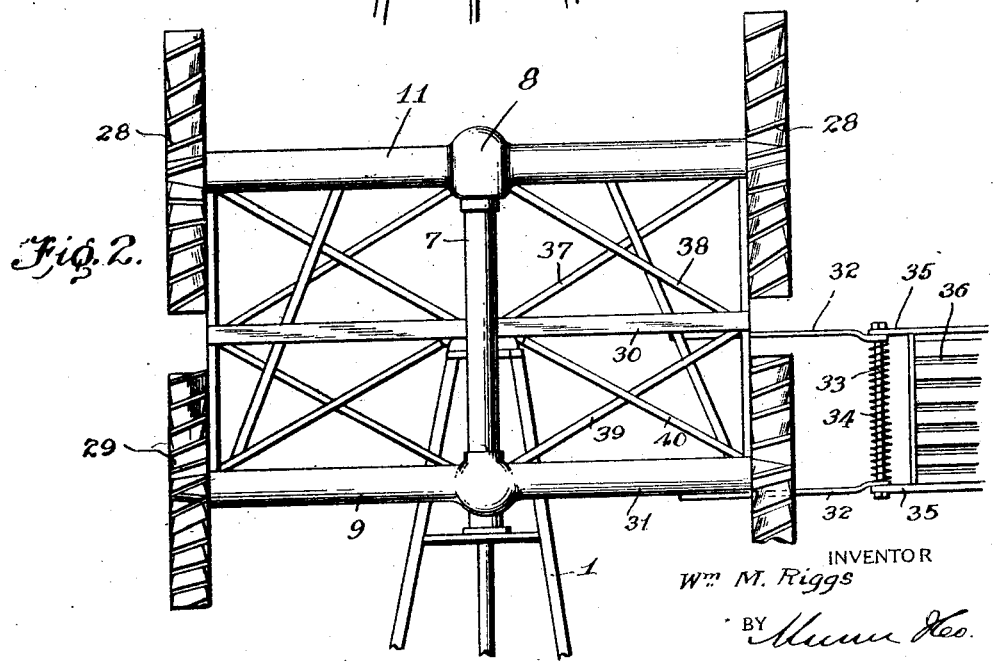

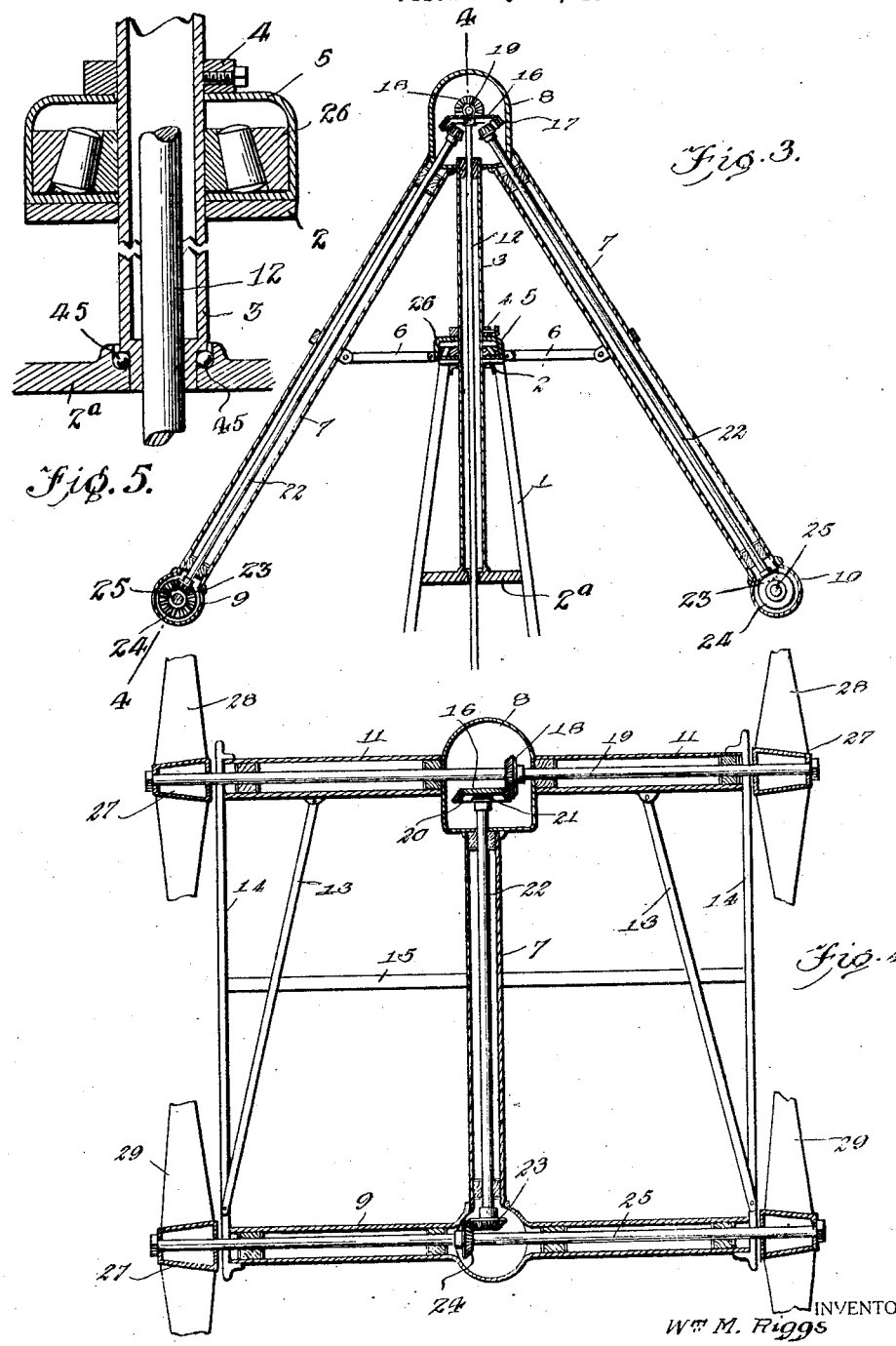

1,556,715

UNITED STATES PATENT OFFICE.

WILLIAM MONROE RIGGS, OF WILLCOX, ARIZONA.

WINDMILL.

Application filed July 17, 1924. Serial No. 726,624.

*To all whom it may concern:*

Be it known that I, WILLIAM MONROE RIGGS, a citizen of the United States, and a resident of Willcox, in the county of Cochise and State of Arizona, have invented certain new and useful Improvements in Windmills, of which the following is a specification.

This invention relates to wind mills and has for its object the provision of a device in which a plurality of wind mills are cooperatively connected for driving motors for use in irrigating arid farm lands.

A further object of the invention is the provision of a compact and unitary air motor having pairs of cooperating wind mills coordinated to drive a single shaft whereby the greatest efficiency and horse power will be had.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a front view of a wind mill constructed in accordance with the principles of my invention.

Figure 2 is a side view of the same.

Figure 3 is a vertical section of the windmill.

Figure 4 is a horizontal section of the same.

Figure 5 is a fragmentary vertical section showing a portion of the power transmission of the wind mill.

Referring more particularly to the drawings, 1 designates a supporting structure having a top plate 2 through which is inserted a shaft housing 3. Intermediate the ends of the shaft housing is rigidly secured a collar 4 which rests upon a bearing housing 5. The bearing housing 5 is connected by means of bars 6 to inclined shaft housings 7. These shaft housings 7 are connected to a gear housing 8 located centrally of the wind mill and are extended downwardly and outwardly at an acute angle to each other and connected at their lower ends to a shaft housing 9 or 10.

The gear housing 8 has its opposite sides connected in any approved manner to alined shaft housings 11, the outer ends of said housings terminating in alinement with the outer ends of housings 9 and 10.

In housing 3 is mounted a vertical and centrally disposed driven shaft 12 which is adapted to be connected in any approved manner with a motor driving a drum or any form of mechanism desired which may be associated for doing a certain amount of work in connection with the wind mill. Housings 11 are connected by means of brace rods 13 to other brace rods 14 which extend between and connect the housings 11 and 9 or 10. A transverse brace bar 15 connects the brace rods 14.

At the upper end of shaft 12 is formed a gear 16 having external teeth 17 in mesh with a bevelled gear 18 mounted centrally upon a shaft 19 located in the housings 11. Gear 16 has internal teeth 20 in mesh with a pair of gears 21, each gear being mounted on a shaft 22 located in one of the inclined housings 7. Upon the lower end of each shaft 22 is mounted a gear 23 in mesh with the gear 24 rigid with a shaft 25. Each housing 9 or 10 provides a casing and bearing for a shaft 25. The gear 24 in housing 9 is located on that side of gear 23 which is opposite to the side on which gear 24 in housing 10 is disposed so that shaft 22 will be so driven and rotate shaft 19 in the same direction.

As shown more particularly in Figure 5, a roller bearing 26 is located within the housing 5 and embraces the housing 3 which revolves axially of casing 5. Upon the outer ends of the shaft 19 is rigidly secured the hubs 27 of the wind mills 28. Upon the outer ends of each shaft 25 is a wind mill 29 having its hub portion 27 rigid with the shaft.

Between a pair of the wind mills 29 at one end of the machine and upon the brace bars 30 and 31 is secured a pair of laterally projecting arms 32. The outer free ends of the arms 32 are offset and perforated to receive a bolt 33 and a spring 34 on the bolt 33 is adapted to maintain the arms 32 in rigid relation with the arms 35 projecting inwardly from a vane 36. The vane 36 is adapted to be acted upon by the wind and revolve the frame and wind mills to a point where the wind will be most effective for causing rotation of the wheels 29 and 28.

Other brace bars 37, 38, 39 and 40 are connected between the bearing cap or casing 5 and the several peripheries of the frame of the wind mill for reinforcing the wind mill in order to prevent breakage of the same.

When the wheels 28 and 29 at the ends of the frame are revolved the shafts 25, 19 are revolved in a similar direction so the gear connections or shafts 22 are revolved and said shafts cooperating with the shaft 19 causes rotation of the vertical shaft 12 from which the power is taken.

A plate 2ª is rigidly secured in position in the supporting frame 1 and has a passage in which is located the reduced end of the sleeve or housing 3. The ball bearing 45 is located between the shoulder on the lower end of the housing 3 and aids in rotatably supporting the lower end of the housing. The driven shaft 12, as will be seen, passes downwardly through the reduced end of the housing 3 to a point where it is operatively connected with some mechanism to be driven.

What I claim is:

1. In a windmill construction, an inverted V-shaped frame formed of a plurality of connected tubular housings and comprising an upper horizontal housing, a housing extending downwardly and outwardly from each side of the upper housing, and a horizontal housing connected intermediate its ends to the lower end of the downwardly extending housing, and a shaft housing extending vertically downward from the upper horizontal housing and forming a rotatable support for said frame, operating means connected in the housings and driving windmills connected to the operating means at each end of the horizontal housings.

2. In a windmill construction, an inverted V-shaped frame formed of a plurality of connected tubular housings and comprising an upper horizontal housing, a housing extending downwardly and outwardly from each side of the upper housing, and a horizontal housing connected intermediate its ends to the lower end of the downwardly extending housing, and a shaft housing extending vertically downward from the upper horizontal housing and forming a rotatable support for said frame, operating means connected in the housings and driving windmills connected to the operating means at each end of the horizontal housings, means for rotatably supporting the vertically disposed housing intermediate its ends, and means supporting the lower end of the vertical housing.

WILLIAM MONROE RIGGS.